R. MILNE.
SAFETY CLUTCH FOR DRILL FEEDS.
APPLICATION FILED MAR. 18, 1909.
945,571.
Patented Jan. 4, 1910.
2 SHEETS—SHEET 2.
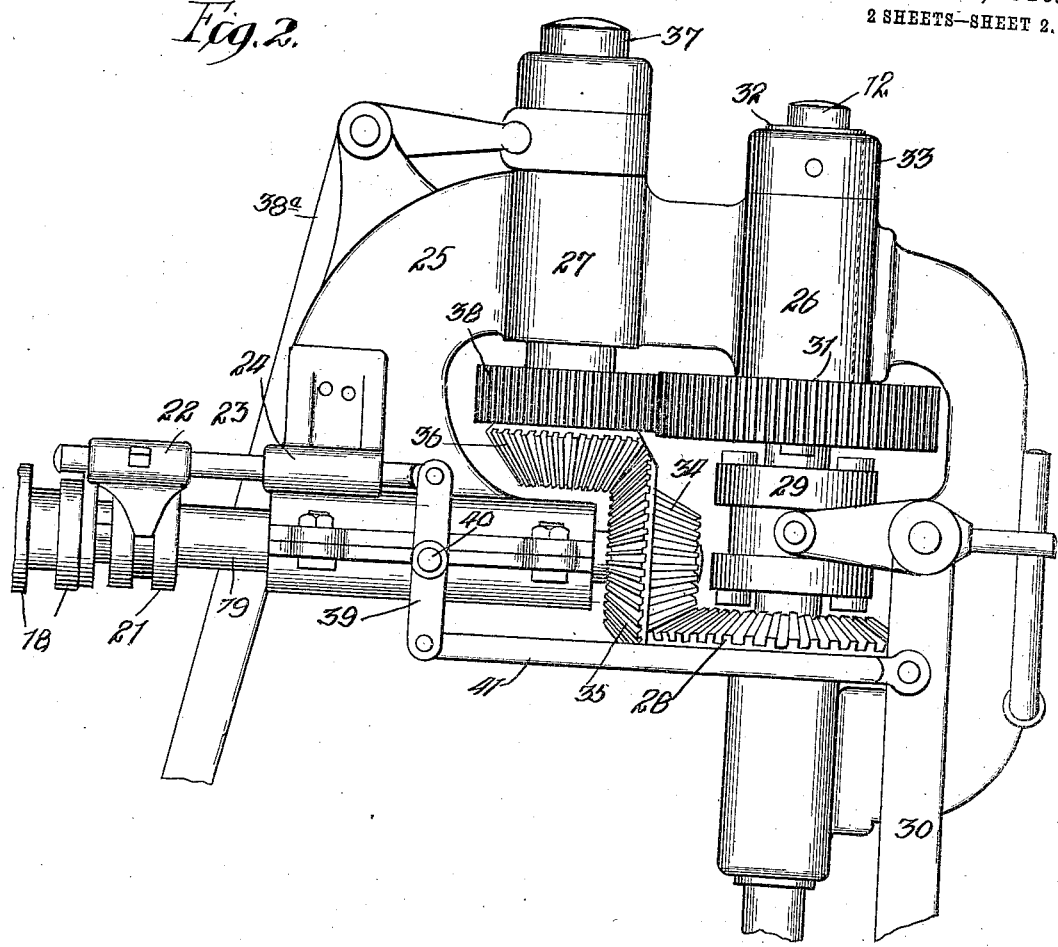
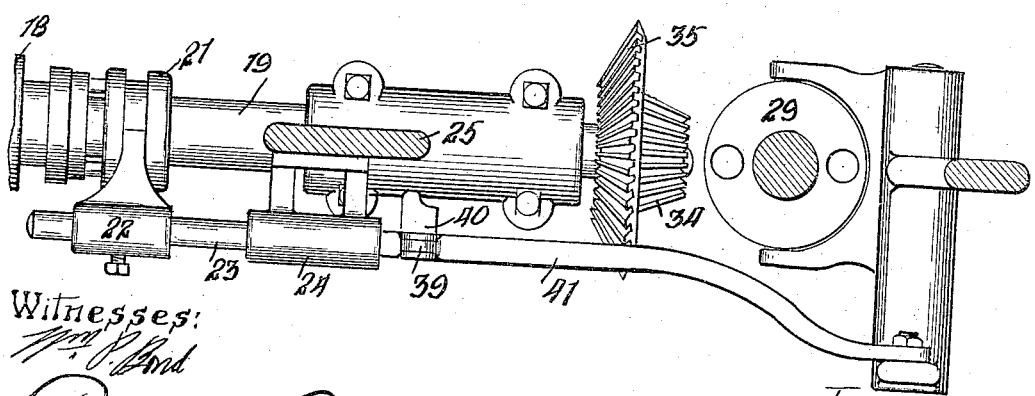

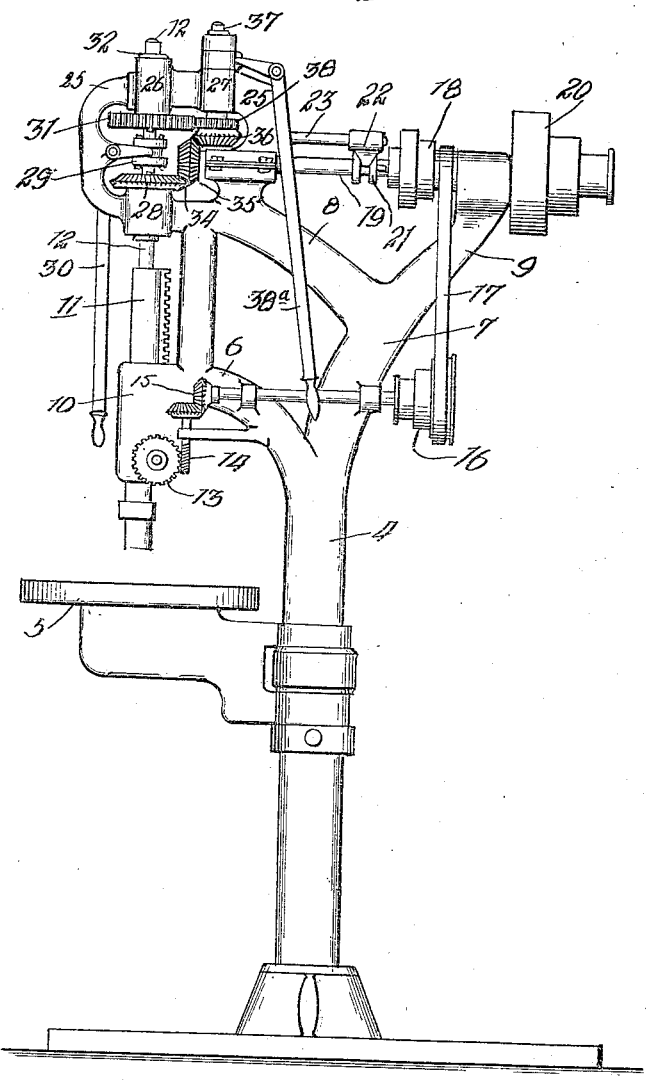

UNITED STATES PATENT OFFICE.

ROBERT MILNE, OF ROCKFORD, ILLINOIS, ASSIGNOR TO ROCKFORD DRILLING MACHINE COMPANY, OF ROCKFORD, ILLINOIS, A CORPORATION OF ILLINOIS.

SAFETY-CLUTCH FOR DRILL-FEEDS.

945,571.     Specification of Letters Patent.     Patented Jan. 4, 1910.

Application filed March 18, 1909. Serial No. 484,205.

*To all whom it may concern:*

Be it known that I, ROBERT MILNE, a citizen of the United States, residing at Rockford, in the county of Winnebago and State of Illinois, have invented certain new and useful Improvements in Safety-Clutches for Drill-Feeds, of which the following is a specification.

In the operation of drilling, breakage sometimes occurs by reason of the failure of the operator to discontinue the feeding operation simultaneously with the cessation of rotation of the drill spindle, with the result that the drill is driven into the metal without rotation, so that the bit, or some portion of the feed mechanism, will be broken or damaged.

The object of the present invention is to provide a safety clutch which will be so arranged as to throw out the feeding mechanism simultaneously with the stop of the drilling mechanism, thereby coördinating these operations and preventing damage due to carelessness of operation.

Further objects will appear from a detailed description of the invention, which consists in the features of construction and combination of parts hereinafter described and claimed.

In the drawings, Figure 1 is a side elevation of the drill press with tapping attachment, showing the safety clutch of the present invention; Fig. 2 an enlarged detail of the tapping attachment with the safety clutch attached thereto; and Fig. 3 a sectional plan view, showing the upper portion of the frame cut away.

The clutch of the present invention is applied to a drill press of standard formation, having a supporting post or column 4, which carries a table 5. The post or column, at its upper end, branches into a front lower arm 6 and a rear arm 7, which latter, in turn, is forked to provide a front upper arm 8 and a rear upper arm 9. The front lower arm terminates in a sleeve 10 through which is slidably entered a feeding rack 11, which rotatably mounts a drill spindle 12. The rack is fed by means of a pinion, not shown, which is actuated by means of a worm wheel 13 meshing with a worm 14, which is driven through gearing and connections 15 of any suitable character. These features of construction are standard, and a detailed description is deemed unnecessary.

The gearing 15 is driven by a cone 16, which is connected by a belt 17 with a driving cone 18 loosely mounted upon a main driving shaft 19 having a driving cone 20 keyed or otherwise rigidly secured thereto. The driving shaft is journaled upon the upper arms of the frame and has slidably mounted thereon a grooved clutch member 21 which is engaged by a forked block 22 carried by a rod 23 which is slidably mounted within a bracket 24 bolted, or otherwise secured to an arch frame 25, which is carried by the upper arm 8 of the frame. The arch frame is provided with a forward journal sleeve 26 and a rear journal sleeve 27, the former of which receives the upper end of the drill spindle 12. The arch frame serves to mount the gearing necessary to give a reversal to the rotation of the drill spindle and constitutes what is ordinarily termed a tapping attachment for the drilling machine proper.

The gearing whereby forward and reverse rotation is imparted to the drill spindle comprises a bevel crown gear 28 which is loosely mounted upon the drill spindle immediately below a grooved clutch member 29, which is splined or otherwise slidably mounted upon the drill spindle and is adapted to be moved either up or down by the movement of an inverted L lever 30 the short end of which engages the groove in the clutch member. Immediately above the clutch member is a driven spur pinion 31 loosely mounted, which is provided with an elongated sleeve 32, which is journaled through the sleeve 26, and carries, at its upper end, a collar 33, which prevents its displacement. The crown gear meshes with a driven bevel gear 34 on the end of the driving shaft 19, in which is mounted an oppositely facing reversing bevel pinion 35, which meshes with a bevel pinion 36 on the lower end of a vertical stub shaft 37, which is journaled through the sleeve 27 and carries a driving spur pinion 38 in mesh with the driven spur pinion 31. The stub shaft 37 is adapted to be lifted by the movement of an L lever 38ᵃ which serves to unmesh the bevel pinions; but the present invention is not concerned with the details of construction of the levers and gears which might be otherwise arranged and located without changing the character of the present invention.

The rod 23, at its forward end, is pivoted to a lever 39, which is pivoted in its center 40 and is connected at its lower end with the clutch lever 30 by means of a bar 41 so hung that a forward movement of the clutch lever 30 will impart a rearward movement to the rod 23.

In use, with the parts shown in the position of Fig. 2, which is the neutral position, no rotation will be imparted to the drill spindle. By drawing forward the lower end of the lever 30 the clutch member 29 will be moved downwardly on the drill spindle and into engagement with the crown bevel gear 28, which is driven by the constantly rotating driving shaft. This forward movement of the lever 30 will impart a rearward movement to the rod 23, which throws the clutch member 21, which is revoluble with the driving shaft, into clutch with the feeding cone 18, or other feeding device which may be employed in place thereof, so that, simultaneously with the forward rotation of the drill spindle, the feeding action will begin and will continue until the work has been drilled to the desired degree. When this point is reached, the operator throws back the lever 30 into position to disengage the crown gear, thereby stopping the feed so that there will be no danger of feeding a non-rotating bit into the work as frequently happens where the feeding and drilling operations are individually controlled. When it is desired to reverse the movement of the drill spindle, the lever 30 will be thrown in to its fullest extent, thereby raising the clutch member 29 into engagement with the drill and spur pinion 31. During this reverse movement the feeding devices remain inactive, since in tapping operations the back feed of the bit will be automatic by reason of its engagement with the threads already formed in a tapped hole.

The invention is one which is adapted for drilling machinery of many standard types, and it is not the intention to limit the invention to feeding mechanism or reversing gears of any particular kind, since these features can be changed or modified as occasion may require.

What I claim as new and desire to secure by Letters Patent is:

1. In a drilling machine of the character indicated, a drill spindle, feeding mechanism therefor, means for rotating the drill spindle, a clutch for engaging the drill spindle with said rotating means, a clutch for actuating the feeding mechanism, and means for simultaneously actuating the two clutches, substantially as described.

2. In a drilling machine of the character indicated, a drill spindle, feeding mechanism therefor, means for rotating the drill spindle, a clutch for engaging the drill spindle with said rotating means, a clutch for actuating the feeding mechanism, a lever engaging one of the clutches, and a connection adapted to actuate the other clutch with the movement of the lever, substantially as described.

3. In drilling machinery of the character described, the combination of a drill spindle, a gear loosely mounted thereon, a driving shaft provided with a driving gear in mesh with the gear on the spindle, a clutch slidably mounted on the spindle and adapted to engage the loosely mounted gear thereon, a feeding member loosely mounted upon the driving shaft, a clutch slidably mounted upon the driving shaft and adapted to actuate said member, and means for simultaneously operating the two clutches, means for feeding the drill spindle, and operative connections between said means and the feeding member on the driving shaft, substantially as described.

4. In drilling machinery of the character described, the combination of a drill spindle, a gear loosely mounted thereon, a driving shaft provided with a driving gear in mesh with the gear on the spindle, a clutch slidably mounted on the spindle and adapted to engage the loosely mounted gear thereon, a feeding member loosely mounted upon the driving shaft, a clutch slidably mounted upon the driving shaft and adapted to actuate said member, a lever engaging one of the clutches, and a connection between the said lever and the other clutch, for simultaneously operating the two clutches, means for feeding the drill spindle, and operative connections between said means and the feeding member on the driving shaft, substantially as described.

5. In drilling machinery of the character described, the combination of a drill spindle, a gear loosely mounted thereon, a driving shaft provided with a driving gear in mesh with the gear on the spindle, a clutch slidably mounted on the spindle and adapted to engage the loosely mounted gear thereon, a feeding member loosely mounted upon the driving shaft, a clutch slidably mounted upon the driving shaft and adapted to actuate said member, an operating lever engaging the spindle clutch, a rod connected with said lever, a pivoted lever with which the rear end of the rod is connected, a second rod connected with the opposite end of said pivoted lever, and a member carried by said rod and engaging the feeding clutch for imparting a rearward movement to the feeding clutch with a forward movement of the operating lever, means for feeding the drill spindle, and operative connections between said means and the feeding member on the driving shaft, substantially as described.

6. In drilling machinery of the character described, the combination of a drill spindle, a gear loosely mounted thereon, a driving shaft provided with a driving gear in mesh with the gear on the spindle, a clutch slidably mounted on the spindle and adapted to engage the loosely mounted gear thereon, a feeding member loosely mounted upon the driving shaft, a clutch slidably mounted upon the driving shaft and adapted to actuate said member, an operating lever of inverted L shape pivoted adjacent to the spindle clutch and having its short end in engagement therewith and adapted to depress the clutch with a forward movement of the long arm of the lever, a rod connected with the long arm of said lever, a pivoted lever with which the rear end of the rod is connected, a second rod connected with the opposite end of the pivoted lever, a member on said rod engaging the feeding clutch for imparting a rearward movement to the feeding clutch simultaneously with a downward movement of the spindle clutch, means for feeding the drill spindle, and operative connections between said means and the feeding member on the driving shaft, substantially as described.

ROBT. MILNE.

Witnesses:
WALTER B. BOWIE,
AMY DENMAN.